Sept. 25, 1928.

J. STUART, 2D 1,685,344

MACHINE FOR SECURING BRIDGE WIRES TO LEAD WIRES OF ELECTRIC BLASTING CAPS

Filed March 24, 1927   5 Sheets-Sheet 1

WITNESS:

INVENTOR
Joseph Stuart, 2nd.
BY
ATTORNEYS

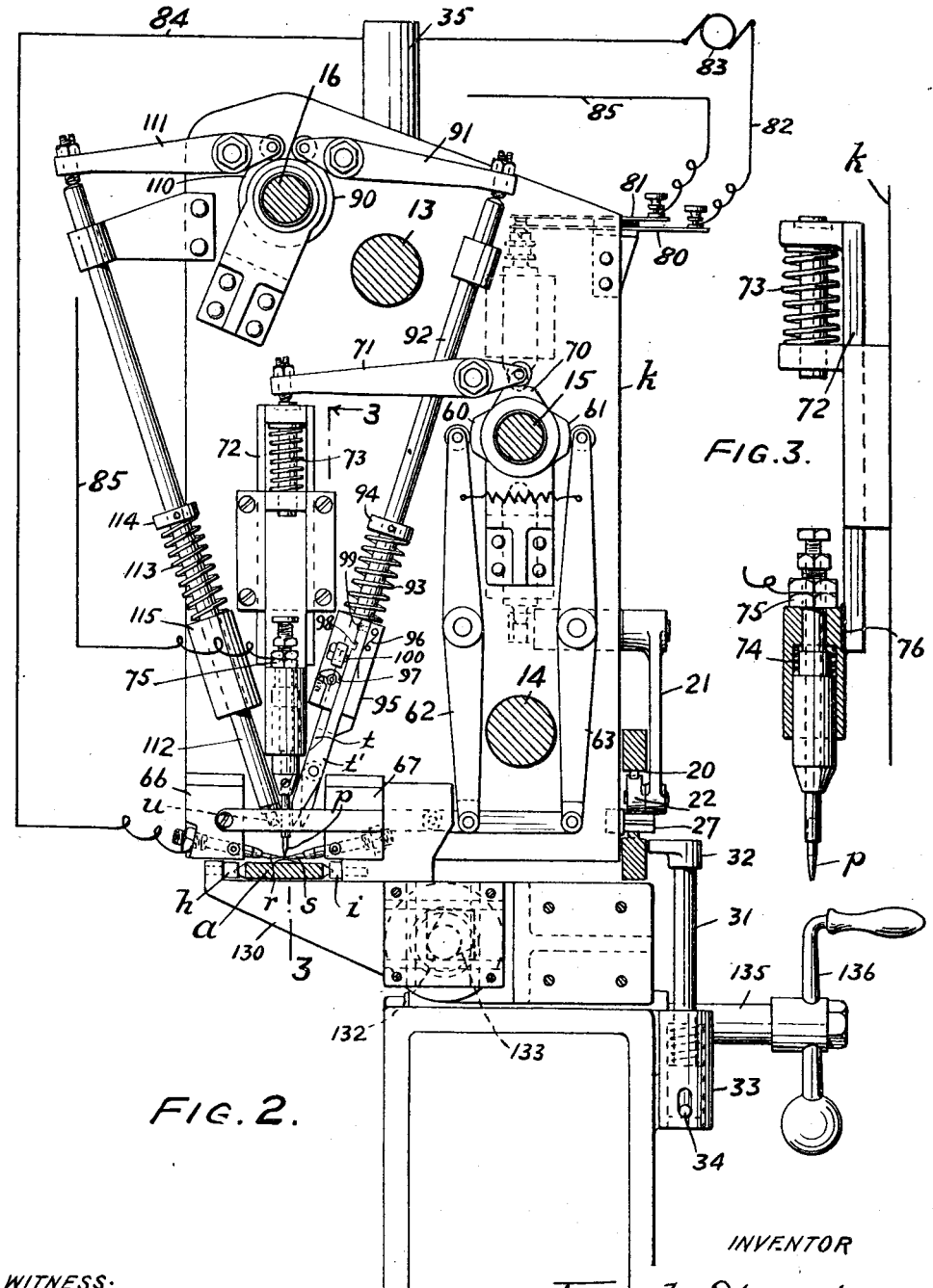

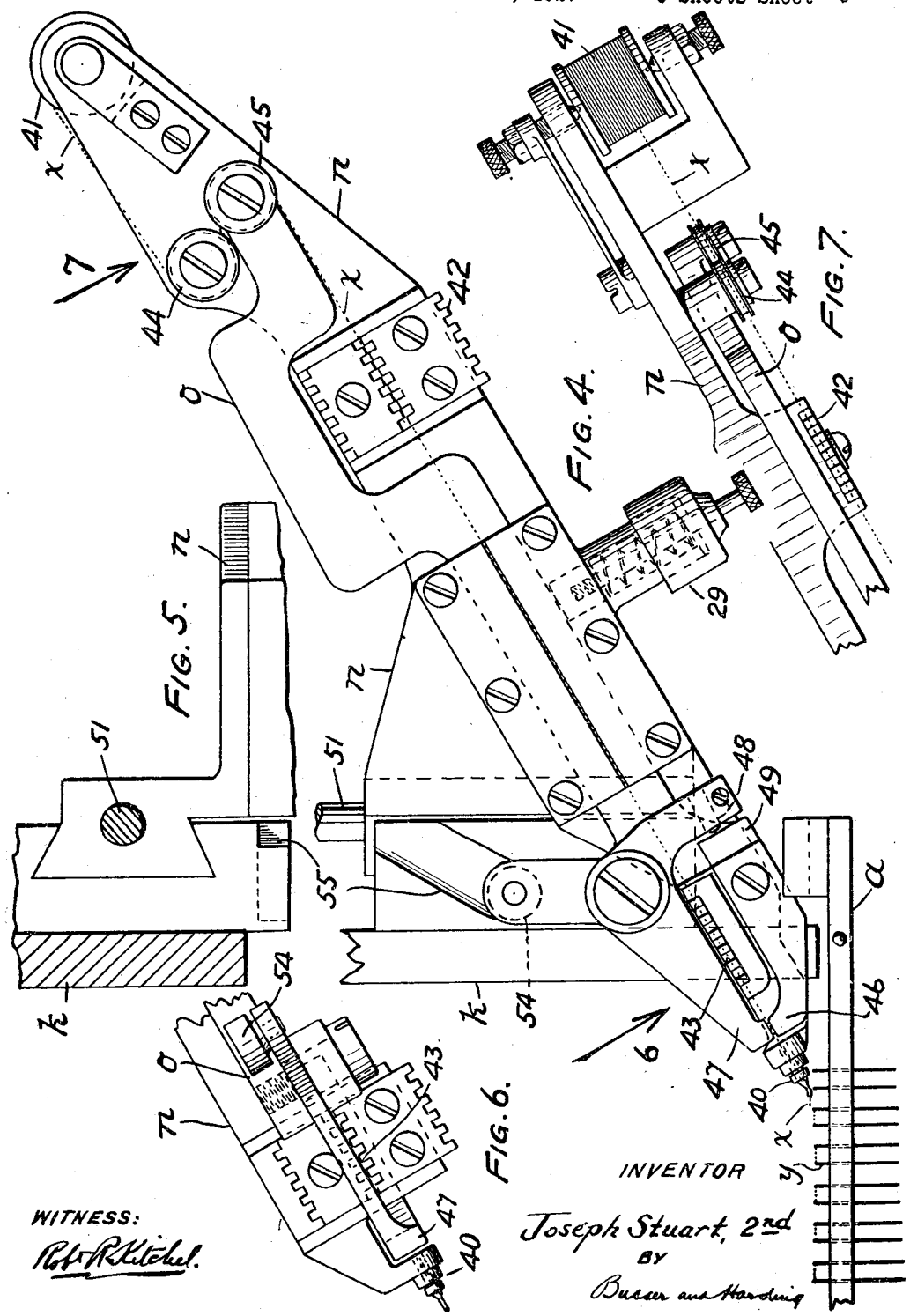

Sept. 25, 1928.  
J. STUART, 2D  
1,685,344  
MACHINE FOR SECURING BRIDGE WIRES TO LEAD WIRES OF ELECTRIC BLASTING CAPS  
Filed March 24, 1927  5 Sheets-Sheet 4

INVENTOR  
Joseph Stuart, 2nd.,  
BY  
Busser and Harding  
ATTORNEYS.

Sept. 25, 1928.  1,685,344
J. STUART, 2D
MACHINE FOR SECURING BRIDGE WIRES TO LEAD WIRES OF ELECTRIC BLASTING CAPS
Filed March 24, 1927    5 Sheets-Sheet 5
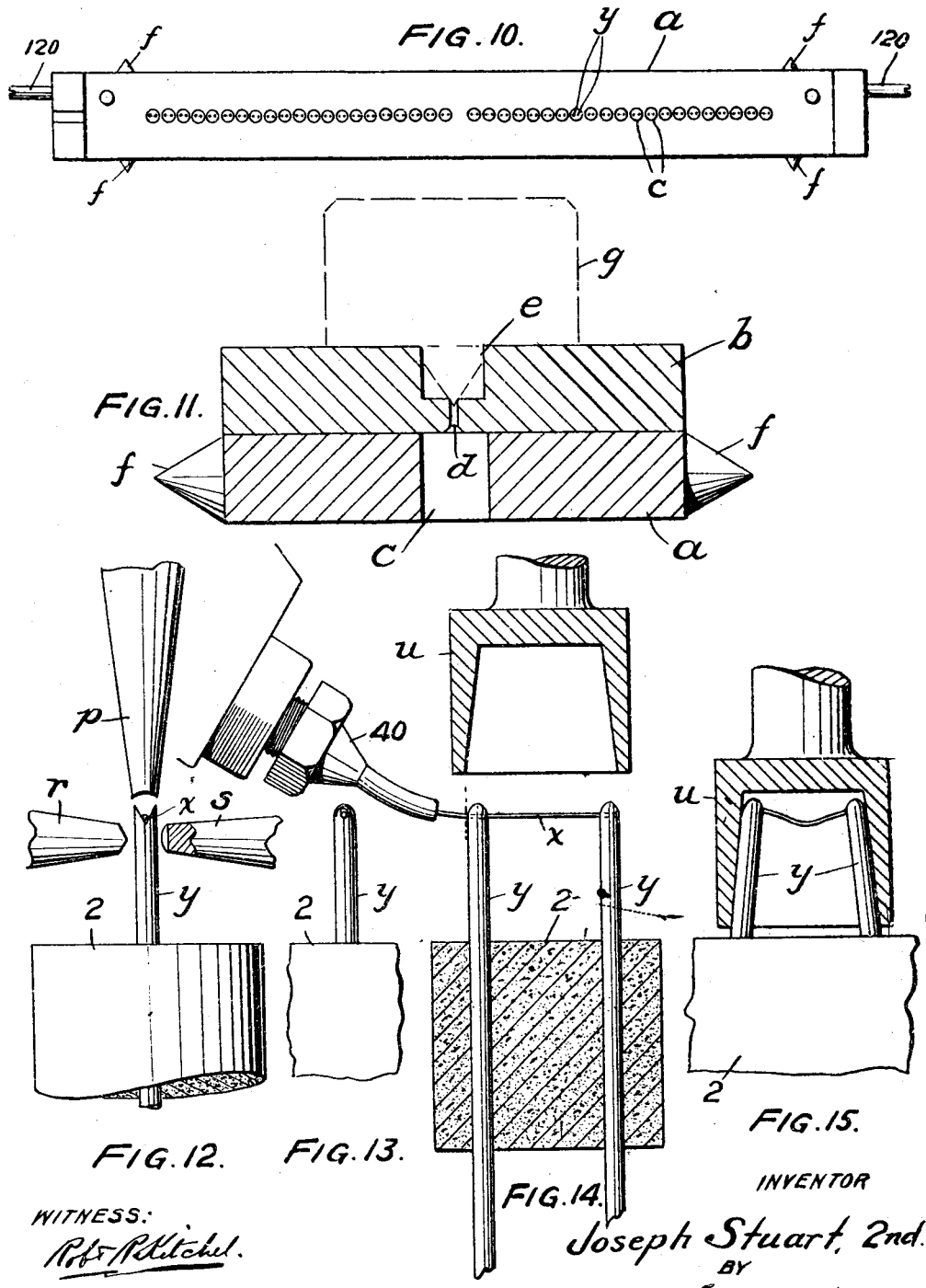
INVENTOR
Joseph Stuart, 2nd.
BY
ATTORNEYS.

Patented Sept. 25, 1928.

1,685,344

UNITED STATES PATENT OFFICE.

JOSEPH STUART, 2D, OF WILMINGTON, DELAWARE, ASSIGNOR TO HERCULES POWDER COMPANY, OF WILMINGTON, DELAWARE, A CORPORATION OF DELAWARE.

MACHINE FOR SECURING BRIDGE WIRES TO LEAD WIRES OF ELECTRIC BLASTING CAPS.

Application filed March 24, 1927. Serial No. 177,959.

In an application filed by me April 23, 1927, Serial No. 185,951, I have set forth an improved process of securing the ends of a fusible bridge wire to the ends of two spaced apart conducting leg or lead wires which extend into the detonator or electric blasting cap of a blasting charge. In this process notches are formed in the extremities of the lead wires, the bridge wire is positioned in the notches so as to extend between, or "bridge", the lead wires, and the ends of the bridge wire are welded to the ends of the lead wires while at the same time the metal of the conducting wires is upset so as to encase the ends of the bridge wires. The parallel ends of the conducting wires are then slightly deflected into a convergent direction in order to bend the bridge wire.

The present invention comprises a machine for performing the series of operations set forth in my said patent application and also other accompanying and collateral operations, whereby a number of pairs of lead wires may be embedded in plugs of a sulfur compound or other appropriate material and whereby the bridge wires may be welded to the lead wires in rapid succession and in a manner which is as nearly entirely automatic as is desirable. In the drawings, which show a preferred embodiment of the invention:

Fig. 2 is a detail view of the mechanism for welding, cutting and deflecting the bridge wire.

Fig. 3 is an enlarged detail view of part of the welding mechanism, taken on the line 3—3 of Fig. 2.

Fig. 4 is a side view of the bridge wire feed carrier and a part of the main carriage on which it is supported.

Fig. 5 is a horizontal cross-section through a part of the main carriage and a part of the bridge wire feed carrier.

Fig. 6 is a plan view of the front part of the bridge wire feed carrier.

Fig. 7 is a plan view of the rear part of the bridge wire feed carrier.

Fig. 10 is a plan view of the die for supporting the lead wires in operative position.

Fig. 11 is an enlarged cross-section through said die and another die that cooperates therewith to properly position the lead wires and facilitate the cutting of the ends thereof.

Fig. 12 is a greatly magnified view showing the end of one of the lead wires with the bridge wire positioned preparatory to welding them together, and showing also part of the welding mechanism.

Fig. 13 is another magnified view showing the two wires welded together.

Fig. 14 is another magnified view of a pair of conducting wires and the bridge wire spanning them, and showing also the mouth of the bridge wire feed.

Fig. 15 is another magnified view of the cupping device for deflecting the lead wires and bending the bridge wires.

Figure 1:
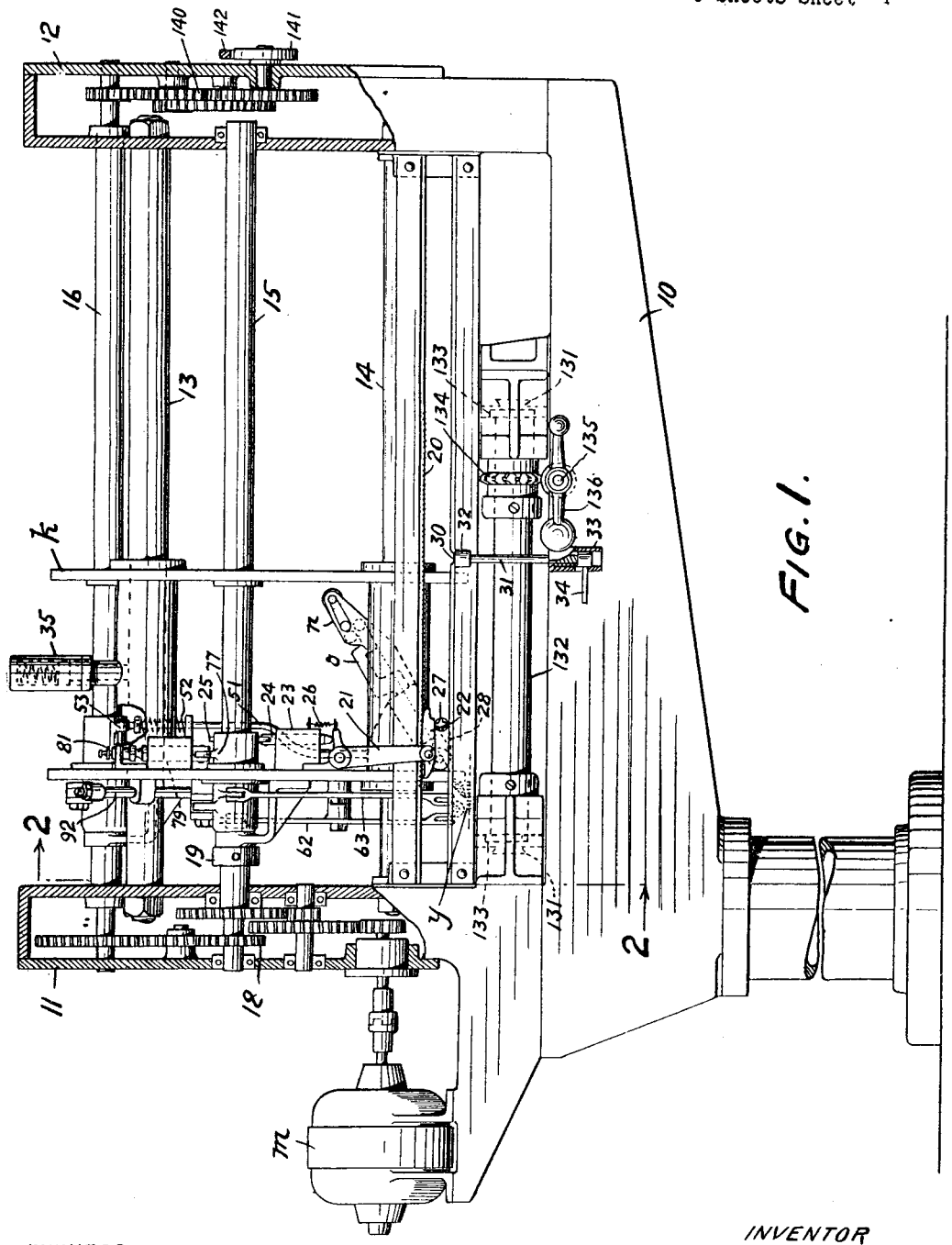
Fig. 1 is a side elevation of the machine.

Before describing the machine, it is desirable to describe, in a general way, the series of operations that it performs, in order that the subsequent recital of the details of construction may be clearly understood.

The ends of a number of pairs of lead wires are inserted into a two part die, one part of which is provided with a number of openings through and beyond which the wires extend. Into these openings is poured a suitable material, such as an appropriate sulfur compound, adapted to quickly harden. The ends of the lead wires projecting beyond the sulfur plugs extend through orifices, formed in the other part of the die, of a diameter adapted to contain the wires. By means of an appropriate tool, the extremities of all the wires are grooved in one operation. The last named part of the die is then removed, leaving the uncovered ends of the lead wires projecting from the plugs.

The bridge wire is unwound from a spool carried by a carrier which is movably mounted on a carriage. The carriage is adapted to move progressively along the die carrying the row of pairs of embedded lead wires. The bridge wire carrier is moved to lay the bridge and within the grooves of two lead wires of a pair so as to span the space between them. Mechanism is then operated to first weld the extremity of the bridge wire to one of the lead wires and to then cut the bridge wire adjacent to the other lead wire, so as to leave a severed section of bridge wire bridging the lead wires and welded to one of them. The bridge wire carrier is then moved to unspool a short length of wire. The carriage is then advanced preliminarily to welding the bridge wire to the other lead wire. This welding operation is then performed, immediately after which the lead wires are slightly bent toward one another so as to bend the bridge wire from a straight line. The carriage is then advanced, thus completing the cycle of operations; the next operation being a movement of the bridge wire carrier to lay the bridge wire within the grooves of the lead wires of the next pair of the series.

Having thus set forth, in a rough way, the general mode of operation of the machine, the construction thereof will now be described in detail.

To a die $a$ (see Figs. 10 and 11) containing a row of cylindrical holes $c$ is applied a die $b$ containing a longitudinally extending groove $e$ and a series of pairs of orifices $d$. Orifices $d$ connect the groove $e$ and the holes $c$ when the die plates are superposed one upon the other as described, there being a pair of orifices $d$ communicating with each hole $c$. The lead wires $y$ extend through the holes $c$ and orifices $d$ and may project irregular distances beyond the orifices $d$ into the groove $e$. The dies $a$ and $b$ are inverted from the position shown in Fig. 11 and a sulfur compound is poured into the holes $c$, forming plugs 2 which quickly harden, leaving the lead wires embedded therein, as shown in Fig. 14. The dies are then turned back into the position shown in Fig. 11 and a tool $g$, having a V-shaped cutting edge that projects into the groove $e$, is pushed along the die $b$, severing the protruding ends of the lead wires $y$ and forming V-shaped grooves in their extremities, the grooved wire being shown on a large scale in Fig. 12. The die $b$ is then removed from die $a$, which then carries the plugs 2 with their projecting lead wires $y$, as shown in Fig. 14.

Figure 8:
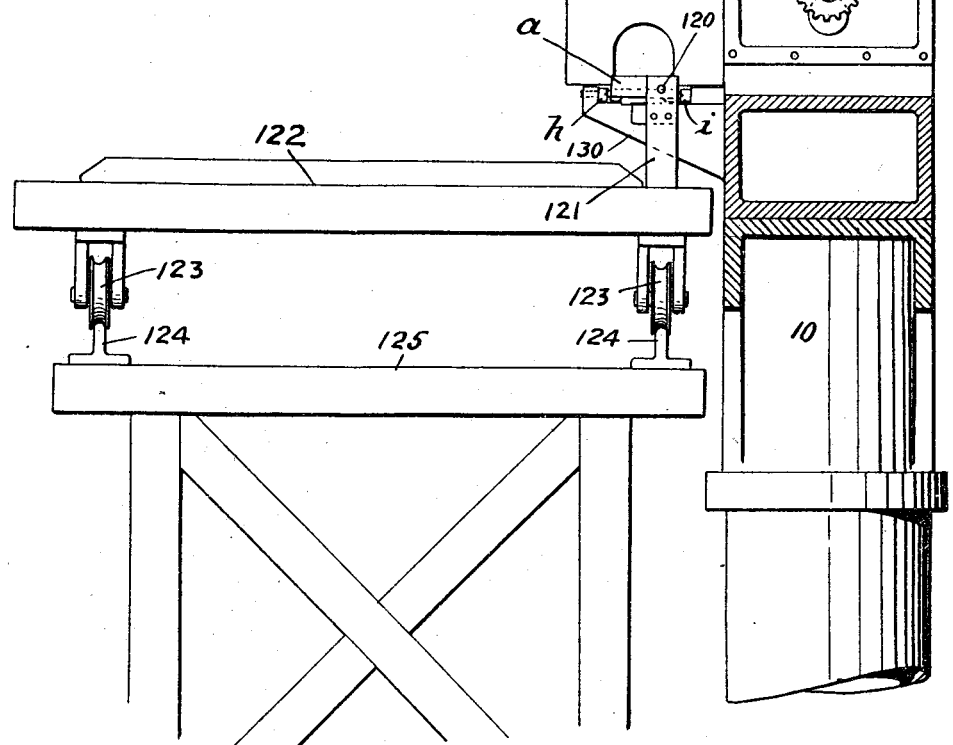
Fig. 8 is a partial end view, partly in section, of the machine and of the lead wire die carrier cooperating therewith.

The die $a$ is provided with two spuds $f$ on each side, whereby the die is adapted to engage aligning blocks $h$ and $i$ on the machine frame 10, one pair of which is shown in Figs. 2 and 8. The die-supporting means will be hereinafter more particularly described; it being desirable at this point to describe the general construction of the machine. See Figs. 1, 2 and 4.

The fixed frame 10 carries the upright hollow standards 11 and 12 carrying between them fixed rods 13 and 14, on which is slidably sleeved the carriage $k$. This carriage carries the mechanism, hereinbefore mentioned, for feeding the bridge wire, welding it to the lead wires, cutting the bridge wire and bending the lead wires, and also carries a pawl that engages with a fixed ratchet bar to move the carriage itself forward step by step in synchronism with the other mechanical movements. All this mechanism is operated from shafts 15 and 16, the ends of which rotate in bearings in standards 11 and 12.

Supported on the machine frame is a motor $m$, and between the shaft of the motor and the shafts 15 and 16 is a train of gears 18 enclosed in hollow standard 11 (see also Fig. 8). The gears are of such relative size and so arranged that shaft 16 is driven at half the speed of shaft 15.

The means for intermittently moving carriage $k$ will now be described. Extending along a frame connecting standards 11 and 12 is a ratchet bar 20. Pivoted on carriage $k$ is a bell-crank lever 21, the depending arm of which carries a pawl lever 22, adapted to engage ratchet 20. Through a block 23 on carriage $k$ extends a slidable rod 24 operable by a cam 25 on shaft 15. A spring 26 connects block 23 with the short arm of lever 21. The spring swings lever 21 in one direction, while cam 25, through rod 24, swings lever 21 in the opposite direction. Pawl 22 therefore is swung back and forth and thereby intermittently advances the carriage.

It should here be noted that it is desirable, at one or more points along the length of die $a$, to strengthen the die by cross-braces (not shown), which makes it necessary to interrupt the row of holes $c$ at one or more points, as, for example, an intermediate point, as shown at Fig. 10, thereby providing two aligning rows of holes, the holes of each row being quite close one to another, while the adjoining holes of different rows are spaced apart a substantial distance. Each reciprocatory motion imparted to pawl 22 by cam 25 is sufficient to move carriage $k$ through its maximum travel, namely, a distance equal to the distance between the more nearly adjacent leg wires of adjoining holes of different rows. Except, however, when the mechanism supported by the carriage has operated on the last leg wire of the first row and is about to operate on the first leg wire of the second row, the carriage should move, each time it is required to do so, only a distance equal to the distance between the ends of a pair of leg wires or the distance between adjacent leg wires of adjacent pairs of the same row. Pawl 22 is, therefore, normally rendered inoperative during the greater part of its movement in the direction to advance the carriage by riding over a guard 27 (carried on the end of a lever 28 pivoted on the carriage), which holds the pawl out of operative relation with ratchet 20 until, as the pawl approaches the end of its movement, its heavy end overrides guard 27, causing it to operatively engage ratchet 20 and shift the carriage along the frame the desired distance above specified.

If, however, the row of holes $c$ is interrupted at an intermediate point, as shown in Fig. 10, it is arranged, after the completion of the bridge welding operation upon the pair of lead wires engaging the last holes of the first series, that pawl 22 shall be operative throughout its entire stroke, in order to move carriage $k$ a distance equal to the distance between the last wire of the last hole of the first series of holes and the first wire of the first hole of the succeeding series of holes. This operation is provided for by recessing, at a proper point 30, the frame along which guard 27 slides so as to allow the guard to drop thereinto, in which lowered position it is ineffective to hold pawl 22 inoperative, so that the pawl becomes effective to shift carriage $k$ the required greater distance.

After the completion of the welding operation upon the lead wires of the last series of holes, the carriage is returned, preferably manually to its extreme left position. During this operation, pawl 22 should remain out of engagement with ratchet 20. Hence, the surface along which guard 27 slides should be uninterrupted. To provide such an uninterrupted surface, a rod 31 is projected upward. Rod 31 carries at its upper end an arm 32, the upper face of which, when the rod is raised, is brought onto a level with the surface of the frame along which guard 27 slides, thereby preventing the guard from dropping into recess 30. The lower end of rod 31 has a spring-pressed head slidable in a bearing 33, the spring normally holding rod 31 down in inoperative position. By means of a pin 34, slidable in a slot in bearing 33, the rod may be raised, and held raised during the movement of carriage $k$ to the left. Carriage $k$ may be so manually shifted by means of a handle 35 on that sleeve of the carriage which slides on rod 13.

To prevent too free movement of the carriage along said rod, handle 35 is utilized as a holder for a friction device comprising a plunger bearing radially against rod 13 and spring pressed against it to produce the desired frictional drag. This insures there be no overthrow or rebound of the carriage when motion is imparted to it.

I shall now describe the means for interrmittently unwinding the bridge wire and intermittently feeding it to the lead wires. See Figs. 4-7.

Slidable vertically on carriage $k$ is a frame which may be designated the bridge wire feed carrier $n$. Slidable longitudinally on carrier $n$ is a slide $o$. Carrier $n$ has at its forward end a nozzle 40, through which the bridge wire $x$ is fed in line with notches in leg wires. The bridge wire extends between this nozzle and a spool 41 at the rear end of carriage $n$. Between spool 41 and nozzle 40, wire $x$ extends between two pairs of wire straighteners 42 and 43. Each of these straighteners comprises a pair of plates whose abutting edges are serrated as shown. The forward end of slide $o$ carries a fixed jaw 46 and a movable jaw 47, the latter being a three-armed lever pivoted between its ends on slide $o$. Wire $x$, in its extension from spool 41, passes around a pulley 44 on carrier $n$, and a pulley 45 on slide $o$ and thence through straighteners 42 and 43, between jaws 46 and 47 and through nozzle 40.

The jaw lever 47 has a very limited movement on its pivot. The end thereof opposite its jaw end carries a stop 48 adapted to engage an abutment 49 on slide $o$, which limits the extent to which the movable jaw can recede from the fixed jaw.

As above stated, carrier $n$ is vertically movable on carriage $k$. Its upward movement is effected by a spring 52 (see Fig. 1) which is confined between an abutment on a projection on carriage $k$ and a nut on the upper end of a rod 51, whose lower end is secured to carrier $n$. Its downward movement is effected by a cam 53 on shaft 16.

From the pivot of the movable jaw lever 47 extends an arm carrying a roller 54 slidable in a cam 55 on carriage $k$. As soon as carriage $n$ begins its upward movement, roller 54 rides along the upper or left-hand wall of cam 55 and swings jaw 47 so as to release the grip of the jaws on wire $x$. This movement, as above stated, is a very limited one by reason of the engagement of stop 48 with abutment 49, but it suffices to release the grip on the wire $x$. As carrier $n$ continues its upward movement, inasmuch as jaw 47 cannot continue to swing, the necessary effect is to slide the slide $o$ rearward relative to carrier $n$. The friction between the wire and the straighteners 42 and 43 is greater than the frictional resistance of the wire to being unwound from the spool. Consequently the wire is held from moving back with the slide, and by reason of the bodily movement of pulley 45 relative to pulley 44, a definite length of wire is unwound from the spool.

In the downward movement of carrier $n$, roller 54 works against the lower or right-hand wall of cam 55. In the first small fractional part of its movement, jaw 47 is swung to grip wire $x$, and thereafter, inasmuch as the jaw can swing no further, the necessary effect is to advance slide $o$, so that when carrier $n$ returns to its lower position, as shown in Fig. 4, slide $o$ has also advanced to its forward position, as shown in the same figure. The grip of jaws 47 and 46 on the wire being a positive one, while the engagement of the straighteners 42 and 43 being merely frictional, the wire is pulled between the straighteners and fed through nozzle 40. It is during this operation that the straighteners act to perform their function.

It is necessary to provide means for preventing too free movement of slide $o$ in the carrier, and I have shown such a device at 29, Fig. 4, which consists of a spring-pressed plunger or brake shoe bearing against the slide, similar to the retarding device in handle 35 for the movement of carriage k.

The sequence of the described operations of carriage n and slide o with respect to the movement of the carriage and to the operations of welding, clipping and cupping, will be set forth after the mechanism for performing these other operations has been described.

The means for welding, etc. will now be described. Reference should be made to Fig. 2, and also to the somewhat diagrammatic views, Figs. 12–15.

The bridge wire $x$ may be assumed to be resting in the V-shaped notches in the upper ends of a pair of lead wires $y$. See Fig. 12. It will be assumed that wire $x$ is about to be welded to and into one of a pair of lead wires $y$. Wire $y$ is then clamped between two diametrically opposite members $r$ and $s$, one of these members, $r$, also functioning as an electrode. At the same time a third member $p$, which acts as the other electrode, moves downward upon the top of the lead wire. Member $p$ has its end hemispherically or otherwise concavely recessed to embrace the walls of the notch in the extremity of the lead wire. As member $p$ continues to move down it upsets inwardly the walls of the notch in the lead wire, embedding the bridge wire therein, as shown in Fig. 13. Therefore, as the bridge wire is welded to the lead wire, it is at the same time surrounded by and encased in the metal of the lead wire, insuring perfect electrical contact therewith.

The described movements of the members $p$, $r$ and $s$ are effected by mechanism operated by cams on shaft 15. Two of these cams, 60 and 61, which may be diametrically oppositely arranged on the shaft, respectively engage rollers on the ends of intermediately pivoted rocking levers 62 and 63, which are respectively connected, by links 64 and 65, with blocks 66 and 67 sildable on the carriage. Block 66 carries electrode $r$. Block 67 carries the backing clamp $s$, between which and electrode $r$ the upper end of the lead wire is held during the welding thereto of the bridge wire. It will be clear from Fig. 2 that these blocks are moved toward each other to advance clamps $r$ and $s$ and away from each other to retract these clamps.

At the same time that cams 60 and 61 are operating, as described, to actuate clamps $r$ and $s$, a cam 70 on shaft 15 is rocking another rock lever 71, which depresses a frame 72 carrying the electrode $p$. The holder is normally held up out of action by means of a spring 73. Electrode $p$ has a limited sliding movement in its holder 72 (see Fig. 3), a spring 74 tending to project it but adapted to yield to allow to the electrode a slight movement of retraction, and permitting a follow-up action upon the weld.

By the mechanism above described, members $p$, $r$ and $s$ are simultaneously advanced into operative position, and during the operation of welding and upsetting electrode $p$ presses endwise against the notched end of the lead wire, yielding slightly, to the extent necessary, against the pressure of spring 74.

The electric welding circuit is not closed until electrodes $p$ and $r$ contact with lead wire $y$. This circuit is also normally held open at the contacts 80 and 81. One of these contacts, 80, is electrically connected through wire 82 with the current generator 83 which, through wire 84, is connected with electrode $r$. The other of these contacts, 81, is electrically connected, through wires 85, with electrode $p$, the latter connection being preferably made by clamping the wire between nuts 75 threaded on the upper end of the electrode, that portion of the holder being electrically insulated as indicated at 76, Fig. 3. Contacts 80 and 81 are, as before stated, normally separated, but by means of a cam 77 on shaft 15, a slide bar 79 is lifted and moves contact 80 against, and into electrical connection with, contact 81. This mechanism insures that the welding circuit is closed when and only when its operation is required.

Assuming that the bridge wire has been welded to one of the lead wires, the next operation is to sever the bridge wire at a point just beyond, preferably about flush with, the other lead wire. The mechanism for so cutting or snipping the bridge wire comprises shears one blade $t'$ of which is movable pivotally on the other blade $t$ to effect the cutting. The shears are movable bodily toward the bridge wire by means of mechanism controlled by a cam 90 on shaft 16. This mechanism comprises a rock lever 91 and a rod 92 carrying the fixed blade $t$ of the shears. The shears are movable bodily away from the bridge wire by means of a spring 93 between a plate or block 95 carried by the carriage and a collar 94 on rod 92.

On plate 95 is a spring 96 which tends to swing blade $t'$ to effect the shearing of the bridge wire. During the downward movement of rod 92 and the shears, blade $t'$ is held in the open position shown in Fig. 2 by means of a spring-actuated dog 97. As soon, however, as the shears are moved fully down, a notch 98 in the shears is brought opposite dog 97, which allows spring 96 to close blade $t'$ and sever the bridge wire. At this time also a headed pin 99 on blade $t'$ just clears a pin 100 on plate 95, this clearance being also necessary to allow blade $t'$ to close. As the high point of cam 90 rides beyond the roller on the end of rock lever 91, spring 93 begins to raise the shear blades and pin 99 rides over pin 100 and opens blade $t'$. At the same time notch 98 rides out of engagement with dog 97, the actuating spring of the dog permitting the dog to swing slightly to allow this disengagement, blade $t'$ thereafter being held open by dog 97, the latter functioning to continue to hold the blade open while notch 98 is riding over pin 100.

The next operation is to move the carrier $n$ upward and to the right (Figs. 1 and 4) in order to unwind a length of bridge wire $x$ from its spool, as previously described.

The next operation is to advance the carriage $k$, that is, move it to the right, Fig. 1, in order to bring the welding mechanism $r$, $s$, $p$, etc. into position to weld the bridge wire $x$ to that one of the lead wires $y$ which adjoins the just severed end of the bridge wire. The welding mechanism is then again operated in the way previously described.

The next operation involves the bending of the lead wires $y$, $y$ from the parallel position shown in Fig. 14 into the converging position shown in Fig. 15, in order to bend the bridge wire into the shape of an arc or a very shallow V, as shown in Fig. 15; thereby preventing subsequent breakage of the bridge wire due to expansion or contraction. This is effected by means of a cup-shaped former $u$. The inner diameter of the cup, at its rim, is slightly greater than the distance between the two wires $y$ plus their diameters. The wall of the cup is of frusto-conical shape, converging toward its closed end. By moving the cup in the direction of the axes of the two wires $y$, the wires are bent into the position shown in Fig. 15.

Cup $u$ is carried on the end of a rod 112, which is moved downward, at a predetermined time, by means of a rock lever 111 actuated by a cam 110 on shaft 16. Rod 112 is moved upward by means of a spring 113 between a collar 114 on the rod and a block 115 in which the rod slides.

The next operation is to move carriage $k$ to the right to bring the welding mechanism into operative relation with the first lead wire $y$ of the next pair of lead wires. Before welding, however, carrier $n$ is moved down and to the left (Figs. 1 and 4), thereby, as previously described, advancing the gripper 46—47 and laying the forward end of the bridge wire over the ends of the two lead wires and into the notches thereof.

This completes the cycle of operations. Other details of the machine, however, remain to be described.

It has been stated that die $a$ is provided with spuds $f$ adapted to be engaged by blocks $h$ and $i$ on the machine frame. This engagement very accurately positions the die so as to insure that the lead wires will be in the exact position required to enable the described series of operations to be successfully performed. The blocks $h$ and $i$ are positioning means rather than supporting means, the die being independently supported by means of standards 121 which engage pins 120 on the ends of the die. The standards are carried on a truck 122 (see Fig. 8) provided with wheels 123 that roll on rails 124 on another truck 125, the upper part only of which is shown in the drawings. Truck 125 is adapted to travel at right angles to the direction of travel of truck 122 so that the die may be moved by truck 122 parallel to its longitudinal direction of extension and then at right angles to its longitudinal direction of extension to effect the final positioning of the lead wires on the machine.

Two of the blocks ($i$) are in fixed position on the machine frame. The other two blocks $h$ are carried on the ends of arms 130, which are capable of being moved laterally and then downwardly from the position shown in Fig. 2 to enable the die $a$ to be moved transversely into its operative position and of being then moved upwardly and laterally (or in directions opposite to those first specified) to effect engagement of those of the spuds $f$ that are intended to engage blocks $h$. To enable this operation to be effected, arms 130 are carried on movable blocks 131, which are provided with suitably shaped orifices, for example, square orifices with rounded corners, within which orifices are cams 133 carried on opposite ends of a shaft 132 (see Figs. 1 and 2). Shaft 132 has a worm wheel 134 which is driven from a worm on a shaft 135. It is preferred to perform the operation manually and therefore shaft 135 is provided with a handle 136. By turning shaft 132 sufficiently to impart the necessary rotation to cams 133, arms 130 are moved to the left, Fig. 2, to release blocks $i$ from the spuds $f$ and then down. By another half rotation of cams 133 arms 130 are moved up and then to the right, or back into the position shown in Fig. 2.

Figure 9:
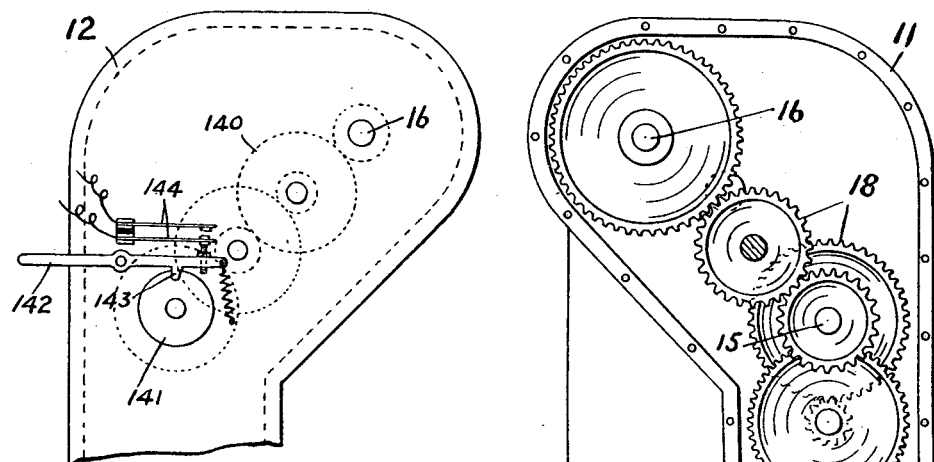
Fig. 9 is an elevation of the automatic stopping mechanism.

It is desirable to automatically stop the machine after the completion of the operation on the last pair of lead wires. Referring to Fig. 9: Driven from shaft 16 is a series of reducing gears 140, the last of which carries a notched wheel or disc 141, which makes one complete revolution during the movement of carriage $k$ along die $a$. During the travel of the carriage, the circuit through the motor $m$ that drives the same is closed through the switch arms 144, which are held closed by a spring-tensioned lever 142. The latter is held in circuit-closing position, against the pull of its spring, by a projection 143 thereon riding along the periphery of disc 141. When, however, carriage $k$ reaches the position beyond which no further movement is required, disc 141 is brought into position to cause lever 142 to be actuated by its spring to snap projection 143 into the notch in disc 141, thereby separating the switch arms 144 and opening the circuit to the motor.

Having now described the construction and operation of the entire machine, a brief summary of its successive operations will be made.

The two-part die $a$—$b$ being in a position inverted from that shown in Fig. 11, the ends of a number of pairs of lead wires are inserted thereinto and the sulphur compound is poured into the orifices c, thereby embedding therein the lead wires near their ends. After the sulfur compound hardens, the two-part die is inverted to occupy the position shown in Fig. 11 and the ends of the lead wires projecting beyond orifices d are cut off and notched.

Die b is now removed. Die a, during the preceding operation, is mounted between standards 121 on truck 122 (see Fig. 8). The latter is movable on truck 125 until the spuds f on one side of die a are immediately opposite blocks i. Truck 122 is then moved to engage the spuds on one side of die a with blocks i. Shaft 132 (see Figs. 2 and 8) is then turned to move arms 130 up and then to the right (Fig. 2) so as to engage block h with the spuds f on the other side of block i thereby exactly positioning the leaf wires to allow the proper operation of the machine thereupon.

The carriage k is shifted to its extreme left-hand position, Fig. 1, by means of the handle 35. This brings the carriage to a point where the welding mechanism is positioned to the left of the first leg wire and spaced therefrom a distance equal to the distance between the adjacent leg wires of a pair. This starting position may be accurately located by providing an abutment for the carriage to strike at the left-hand end of its travel, Fig. 1, and I have shown a collar 19 set-screwed to shaft 15 for this purpose. Lever 142 (see Fig. 9) is then lifted to disengage it from notched disc 141 and held into position to close the switch 144, thereby starting the motor m. After the machine has started, lever 142 is released and is held in circuit-closing position by the smooth face of disc 141.

The first operation of the machine is to move the carriage to align the welding mechanism with the first leg wire of the first row. The next operation is to move carrier n down on carriage k (see Fig. 4), this being effected by cam 53 (see Fig. 1) on shaft 16. In the downward movement of carrier n, jaw 47 is swung to grip wire x, and slide o is then advanced (to the left) into position to feed the bridge wire x through nozzle 40 and lay it over the first pair of lead wires y. At the same time the wire is pulled between straighteners 42 and 43.

Cams 60 and 61 (see Fig. 2) on shaft 15, through the mechanism actuated thereby, now advances clamps r and s; and cam 70 on shaft 15, through the mechanism actuated thereby, advances electrode p. At the same time, cam 77 (see Fig. 1) on shaft 15 lifts slide bar 79 and closes switch 80—81 (Fig. 2), thereby closing the welding circuit. Thereby the bridge wire x is welded to the first lead wire y of the first pair of bridge wires.

Cam 90 on shaft 16, through the mechanism actuated thereby, now operates the shears t—t' to sever the bridge wire at a point just beyond, preferably about flush with, the second lead wire of the first pair.

Cam 53 on shaft 16 now retreats to allow spring 52 to lift carrier n (Fig. 4). In this movement of the carrier, jaw 47 swings to release its grip on the bridge wire and slide o is moved to the right, thereby unwinding a length of wire from spool 41.

Cam 25 on shaft 15 (Fig. 1) now actuates pawl 22, and carriage k is shifted to the right to position the welding mechanism r, s, p, etc., preparatory to operating it to weld the severed end of the bridge wire to the second wire of the pair of lead wires.

Cams 60 and 61 and cam 70 now again move the welding mechanism into operative position, cam 70 effecting the closing of the welding circuit as before; and the severed end of the bridge wire is welded to the second wire of the pair of lead wires.

Cam 110 (Fig. 2) on shaft 16 now effects the downward movement of cup u to deflect the two lead wires into a relatively convergent position, there bending the bridge wire, as shown in Fig. 15.

Cam 25 on shaft 15 now again actuates pawl 22 and moves the carriage to the right to position the welding mechanism r, s, p, etc., preparatory to operating it to weld the bridge wire to the first wire of the second pair of lead wires.

This completes the sequence of operations, the next operation being to move carrier n down on carriage k to grip the bridge wires and feed it through nozzle 40 and lay its front end over the second pair of lead wires.

In the foregoing brief summary of the operation of the machine, the retraction of the welding mechanism, the bridge wire clipping mechanism and the lead wire deflecting operation, by their actuating springs is not described, as it will be understood that in each case the retraction occurs immediately after the mechanism performs its described operation.

When the pairs of bridge wires are positioned in the die a, as shown in Fig. 10, the distance between the centers of a pair of lead or leg wires is less than the distance between adjacent lead or leg wires of adjacent pairs. Consequently, carriage k should be advanced, along one row of bridge wires, not uniform distances step by step, but distances which are alternately longer and shorter. This operation is effected by providing the ratchet 20 with teeth that are alternately longer and shorter. Preparatory to moving the carriage a shorter distance, the pawl 27 engages a longer tooth and has a certain amount of lost motion before it operatively engages the tooth, thereby moving the carriage a shorter distance than when the pawl engages a shorter tooth.

The machine is capable of operating not only with accuracy, but with great rapidity. The welding of the bridge wires to the lead or leg wires is much more dependable than the operation of soldering, and the additional operation of encasing the ends of the bridge wires in the metal of the lead wires makes the connection an absolutely secure one. The importance of providing a surely permanent bridging of the lead wires can hardly be exaggerated, since the detonation of the blasting cap of the blasting charge should be effected with absolute certainty. My machine possesses numerous other advantages, among which may be mentioned the avoidance of waste of bridge wire.

Having now fully described my invention, what I claim and desire to protect by Letters Patent is:

1. In a machine for securing a bridge wire between the ends of the lead wires of a detonator, in combination, mechanism to weld the bridge wire to, and encase it in the metal of, the lead wires, and means to move said mechanism into and out of operative position.

2. In a machine for securing a bridge wire between the ends of the lead wires of a detonator, in combination, means to feed the bridge wire into position over, and spanning the ends of, the lead wires, and means to weld the bridge wire to, and encase it in the metal of, the ends of the lead wires.

3. In a machine for securing a bridge wire between the ends of the lead wires of a detonator, in combination, an electric welding circuit, electrodes in the circuit, and means to position the electrodes to cause the current to pass through the junction of a lead wire and the bridge wire, said means adapted to move one of said electrodes toward the end of the lead wire and upset the metal thereof to encase the bridge wire therein substantially simultaneously with the welding operation.

4. In a machine for securing a bridge wire between the ends of the lead wires of a detonator, in combination, an electric welding circuit, electrodes in said circuit, clamps between which a lead wire is adapted to be confined, one of said clamps acting as a electrode, an electrode movable against the end of a lead wire, and means to move said electrodes and clamps into and out of operative position.

5. In a machine for securing a bridge wire between the ends of the lead wires of a detonator, in combination, means to weld the ends of the bridge wire to, and encase it in the metal of, the ends of the lead wires, and a device, movable in the longitudinal direction of extension of the lead wires, adapted to engage the ends thereof and bend them toward each other sufficiently to bend the bridge wire away from a straight line position.

6. In a machine for securing a bridge wire between the ends of the lead wires of a detonator, in combination, means to feed a bridge wire into position to extend from the end of one lead wire to and beyond the end of the other lead wire, means to weld the bridge wire to both lead wires, and a cutter adapted to sever the bridge wire at a point adjacent the latter named lead wire.

7. In a machine for securing a bridge wire between the ends of the lead wires of a detonator, in combination, means to feed a bridge wire into position to extend from the end of one lead wire to and beyond the end of the other lead wire, means to weld the bridge wire to the two lead wires successively, a cutter adapted to sever the bridge wire at a point adjacent the second named lead wire, and means to operate the cutter between the two specified welding operations.

8. In a machine for securing a bridge wire between the ends of the lead wires of a detonator, in combination, means to feed a bridge wire into position to extend from the end of one lead wire to and beyond the end of the other lead wire, means to weld the bridge wire to both lead wires, a cutter adapted to sever the bridge wire at a point adjacent the latter named lead wire, and a device, operable after the welding and cutting operations, adapted to engage the lead wires and bend them toward each other to effect a bending of the bridge wire.

9. In a machine for securing a bridge wire between the ends of the lead wires of a detonator, in combination, means to support a series of pairs of lead wires, means to feed the bridge wire into position over and spanning the ends of, the lead wires of each pair, welding mechanism adapted to weld the bridge wire to the pairs of lead wires successively, a carriage for the welding mechanism, means to intermittently advance the carriage to position the welding mechanism, and means, operable after each of said positionings, to move the welding mechanism into and out of operative relation with the wires to be welded.

10. In a machine for securing a bridge wire between the ends of the lead wires of a detonator, in combination, means to support a series of pairs of lead wires, welding mechanism adapted to successively weld different sections of a bridge wire to successive pairs of lead wires, bridge wire feeding mechanism, a carriage carrying the welding mechanism and the bridge wire feeding mechanism, and means to intermittently advance the carriage.

11. In a machine for securing a bridge wire between the ends of the lead wires of a detonator, in combination, a support for a series of pairs of lead wires, welding mechanism adapted to successively weld different sections of a bridge wire to the different pairs of lead wires, a carriage for the welding mechanism, means to intermittently move the carriage to position the welding mechanism, means to move the welding mechanism, when so positioned, into and out of operative relation with the wires to be welded, a bridge wire cutter carried by the carriage, means to actuate the cutter, a bridge wire feed and means to operate the same intermittently to position the forward end of the bridge wire, after a section thereof has been severed, relatively to a pair of lead wires.

12. In a machine for securing a bridge wire between the ends of the lead wires of a detonator, in combination, a support for a series of pairs of lead wires, a bridge wire feed, mechanism adapted to weld different sections of a bridge wire to different pairs of lead wires, a cutter for severing successive sections of bridge wire, a carriage supporting the welding mechanism and cutter, means to intermittently move the carriage and operate the bridge wire feed, welding mechanism and cutter to position sections of bridge wire relatively to successive pairs of lead wires and alternately therewith weld and sever successive sections of bridge wire.

13. In a machine for securing a bridge wire between the ends of the lead wires of a detonator, in combination, a support for positioning a series of pairs of lead wires in a single row, a bridge wire feed mechanism adapted to weld successive sections of a bridge wire to successive pairs of lead wires, a cutter for severing successive sections of bridge wire, a carriage supporting the welding mechanism, cutter and bridge wire feed, and means to sequentially operate the bridge wire feed to bring a section of bridge wire into operative relation with a pair of lead wires, operate the welding mechanism to weld one lead wire to said bridge wire section, operate the cutter to sever said section of bridge wire, move the carriage, operate the welding mechanism to weld the other wire to said bridge wire section, and move the carriage.

14. In a machine for securing a bridge wire between the ends of the lead wires of a detonator, in combination, means to support a series of pairs of lead wires, a bridge wire feed, welding mechanism adapted to weld the bridge wire to the lead wire, a carriage carrying the bridge wire feed and welding mechanism, a frame on which the carriage is slidable, shafts along which the carriage is slidable, cams splined on the shafts and movable with the carriage, means to rotate the shafts, and means operable from different cams to intermittently move the carriage, operate the bridge wire feed and actuate the welding mechanism.

15. In a machine for securing a bridge wire between the ends of the lead wires of a detonator, in combination, means to support a series of pairs of lead wires, means to feed the bridge wire into position to be welded to the lead wires, mechanism to weld the bridge wire to the lead wires, a carriage on which the welding mechanism is carried, a frame on which the carriage is slidable, and means to intermittently slide the carriage on the frame and alternately therewith actuate the welding mechanism.

16. In a machine for securing a bridge wire between the ends of the lead wires of a detonator, in combination, lead wire supporting means, a bridge wire carrier, gripping jaws and a bridge wire spool thereon, and means operable in one direction to grip the jaws upon the bridge wire and feed same to the lead wires and operable in the other direction to unwind a length of bridge wire from the spool.

17. In a machine for securing a bridge wire between the ends of the lead wires of a detonator, in combination, lead wire supporting means, a bridge wire carrier, gripping jaws and a bridge wire spool thereon, means operable in one direction to grip the jaws upon the bridge wire and feed same to the lead wires and operable in the other direction to unwind a length of bridge wire from the spool, and wires straighteners pivoted between the jaws and the spool and which engage the bridge wire with sufficient force to hold it while it is being unwound from the spool but not to hold it against the positive pull of the jaws.

18. In a machine for securing a bridge wire between the ends of the lead wires of a detonator, in combination, lead wire supporting means, a bridge wire carrier, a slide and a movable gripping jaw on the carrier, a bridge wire spool on the carrier, means operable by the slide in its movement of retraction to unwind a length of bridge wire from the spool, and means to move said jaw into gripping position and advance the slide and thereby feed the bridge wire to the lead wires and alternatively therewith to release the jaw and retract the slide.

19. In a machine for securing a bridge wire between the ends of the lead wires of a detonator, in combination, means for supporting a row of lead wires, a carriage and means to move it intermittently along the row of lead wires, a bridge wire carrier extending along the row of lead wires, means to intermittently move said carrier up and down on said carriage, and means actuable in the vertical movement of the carrier to feed bridge wire into operative relation with pairs of lead wires.

20. In a machine for securing a bridge wire between the ends of the lead wires of a detonator, in combination, means for supporting a row of lead wires, a carriage and means to move it intermittently along the row of lead wires, a bridge wire carrier extending along the row of lead wires, means to intermittently move said carrier up and down on said carriage, a slide on said carrier, two jaws carried by said slide, one of said jaws being movable into and out of gripping relation with the other jaw, and cam mechanism operable in the movement of said carrier in one direction to first swing the movable jaw into gripping relation with the fixed jaw and then move the slide to feed bridge wire into operative relation with a pair of lead wires.

21. In a machine for securing a bridge wire between the ends of the lead wires of a detonator, in combination, lead wire supporting means, a bridge wire feed carrier, gripping jaws at one end of the carrier, a bridge wire spool on the other end of the carrier, two sets of wire straighteners between the jaws and the spool, the two sets of straighteners adapted to frictionally engage the wires with pressures operating at right angles to each other, means to move the gripping jaws away from the straighteners to feed the bridge wire to the lead wires and pull the same through the straighteners, and means to pull the bridge wire between the straighteners and the spool to unwind a length of bridge wire from the spool.

22. In a machine for securing a bridge wire between the ends of the lead wires of a detonator, in combination, lead wire supporting means, a bridge wire feed carrier, a bridge wire gripper and a bridge wire spool on the carrier, wire straightening means between the gripper and spool adapted to frictionally engage the bridge wire, means to move the gripper to feed the bridge wire and pull it through the straightening means. and means to pull the bridge wire between the straightening means and the spool to unwind a length of bridge wire from the spool.

23. In a machine for securing a bridge wire between the ends of the lead wires of a detonator, in combination, means for supporting a row of lead wires, a carriage and means to move it intermittently along the row of lead wires, a bridge wire carrier extending along the row of lead wires, means to intermittently move said carrier up and down on said carriage, a slide on said carrier, two jaws carried by said slide, one of said jaws being movable into and out of gripping relation with the other jaw, a spool on the carrier adapted to hold a reel of bridge wire, cam mechanism operable in the movement of said carrier in one direction to first close the movable jaw and then advance the slide to cause said jaws to feed bridge wire into operative relation with a pair of lead wires and operable in the movement of the carrier in the other direction to open the movable jaw and then retract the slide, and means operable in the retraction of the slide to unwind a length of bridge wire from said spool.

24. In a machine for securing a bridge wire between the ends of the lead wires of a detonator, in combination, means to support a series of pairs of lead wires, means to feed the bridge wire into position to weld successive lengths thereof to the lead wires of successive pairs, a carriage and means to intermittently move it along the lead wires, an electrode movable toward the end of a lead wire, clamps movable in opposite directions into engagement with opposite sides of a lead wire, a rotatable shaft, cam-actuated mechanism operable by the shaft to move the clamps in unison against the lead wire, cam-actuated mechanism operable by the shaft to advance said electrode, and an electric circuit including said electrode, said electrode and clamps and their actuating mechanisms being carried by the carriage and movable therewith in its intermittent travel.

25. In a machine for securing a bridge wire between the ends of the lead wires of a detonator, in combination, means to support a series of pairs of lead wires, means to feed the bridge wire into operative relation with the lead wires, an electric welding circuit, welding mechanism including electrodes in said circuit, means to advance the welding mechanism into position to weld the bridge wire to the lead wires, a switch in said circuit, and means, operable concurrently with the means to advance the welding mechanism, to close said switch.

26. In a machine for securing a bridge wire between the ends of the lead wires of a detonator, in combination, means to support a row of lead wires, a carriage movable along said row, means to move said carriage step by step distances equal to the distances between successive lead wires, mechanism to weld a bridge wire successively to the lead wires, mechanism for severing the bridge wire between successive pairs of lead wires, two shafts, cams on one shaft adapted to actuate the carriage and welding mechanism respectively, and a cam on the other shaft adapted to actuate the bridge wire severing mechanism.

27. In a machine for securing a bridge wire between the ends of the lead wires of a detonator, in combination, means to support a row of lead wires, a carriage movable along said row, means to move said carriage step by step distances equal to the distances between successive lead wires, mechanism to weld the bridge wire successively to the lead wires, mechanism for severing the bridge wire between successive pairs of lead wires, mechanism for bending successively the secured bridge wires, two shafts, cams on one shaft adapted to actuate the carriage and welding mechanism respectively, and cams on the other shaft adapted to actuate the bridge wire severing mechanism and the bridge wire bending mechanism successively.

28. In a machine for securing a bridge wire between the ends of the lead wires of a detonator, in combination, means to support a row of lead wires, a carriage movable along said row, means to move the carriage step by step distances equal to the distances between successive lead wires, bridge wire unreeling and feeding mechanism and a carrier therefor on said carriage, mechanism to weld the bridge wire successively to the lead wires; two shafts, cams on one shaft adapted to actuate the carriage and welding mechanism respectively, and a cam on the other shaft adapted to operate said carrier.

29. In a machine for securing a bridge wire between the ends of the lead wires of a detonator, in combination, means to support a row of lead wires, a carriage movable along said row, means to move the carriage step by step distances equal to the distances between successive lead wires, bridge wire unreeling and feeding mechanism and a carrier therefor on said carriage, mechanism to weld the bridge wire successively to the lead wires, mechanism for severing the bridge wire between successive pairs of lead wires, two shafts, cams on one shaft adapted to actuate the carriage and welding mechanism respectively, and cams on the other shaft adapted to operate said carrier and the bridge wire severing mechanism respectively.

30. In a machine for securing a bridge wire between the ends of the lead wires of a detonator, in combination, means to support a row of lead wires, a carriage movable along said row, means to move the carriage step by step distances equal to the distances between successive lead wires, bridge wire unreeling and feeding mechanism and a carrier therefor on said carriage, mechanism to weld the bridge wire successively to the lead wires, mechanism for severing the bridge wire between successive pairs of lead wires, mechanism for bending successively the secured bridge wires, two shafts, cams on one shaft adapted to actuate the carriage and welding mechanism respectively, and cams on the other shaft adapted respectively to operate said carrier, the bridge wire serving mechanism and the bridge wire bending mechanism.

31. In a machine for securing a bridge wire between the ends of the lead wires of a detonator, in combination, means adapted to support a plurality of aligning rows of lead wires and to space apart the lead wires of each row at uniform distances and the adjacent lead wires of adjacent rows at a greater distance, a carriage movable along the rows of lead wires, mechanism carried by said carriage for securing bridge wire to lead wires of successive pairs, means to advance the carriage step by step along each row distances equal to the distances between successive lead wires of each row and to advance the carriage from one row to another a distance equal to the distance between adjacent lead wires of adjacent rows.

32. In a machine for securing a bridge wire between the ends of the lead wires of a detonator, in combination, means adapted to support a plurality of aligning rows of lead wires and to space apart the lead wires of each row at uniform distances and the adjacent lead wires of adjacent rows at a greater distance, a carriage movable along the rows of lead wires, mechanism carried by said carriage for securing bridge wire to lead wires of successive pairs, carriage feeding mechanism adapted to advance the carriage step by step along each row a distance equal to the distance between adjacent lead wires of adjacent rows, and means adapted to decrease the effective feeding distance of the carriage feeding mechanism at each stroke thereof except at that point in its travel at which it moves out of operative relation with one row and into operative relation with another row.

33. In a machine for securing a bridge wire between the ends of the lead wires of a detonator, in combination, means adapted to support a plurality of aligning rows of lead wires and to space apart the lead wires of each row at uniform distances and the adjacent lead wires of adjacent rows at a greater distance, a carriage movable along the rows of lead wires, mechanism carried by said carriage for securing bridge wire to lead wires of successive pairs, pawl and ratchet mechanism adapted to advance the carriage step by step along each row a distance equal to the distance between adjacent lead wires of adjacent rows, a guard movable with the carriage and adapted to shorten the effective stroke of the pawl to a distance equal to the distance between lead wires of each row, and a device adapted to render said guard inoperative at that point in the travel of the carriage at which it moves out of operative relation with one row and into operative relation with the other row.

34. In a machine for securing a bridge wire between the ends of the lead wires of a detonator, in combination, means adapted to support a plurality of aligning rows of lead wires and to space apart the lead wires of each row at uniform distances and the adjacent lead wires of adjacent rows at a greater distance, a carriage movable along the rows of lead wires, mechanism carried by said carriage for securing bridge wire to lead wires of successive pairs, pawl and ratchet mechanism adapted to advance the carriage step by step along each row a distance equal to the distance between adjacent lead wires of adjacent rows, a guard movable with the carriage and adapted to shorten the effective stroke of the pawl to a distance equal to the distance between lead wires of each row, a device adapted to render said guard inoperative at that point in the travel of the carriage at which it moves out of operative relation with one row and into operative relation with the other row, and means whereby said device may be rendered inoperative during the return travel of the carriage.

35. In a machine for securing a bridge wire between the ends of the lead wires of a detonator, in combination, an orificed plate adapted to support a series of lead wires, a machine frame, mechanism thereon adapted to secure bridge wire to successive pairs of lead wires, spuds on opposite sides of the plate, and centering blocks on opposite sides of the plate with which said spuds are adapted to engage, one of said blocks being laterally movable.

36. In a machine for securing a bridge wire between the ends of the lead wires of a detonator, in combination, an orificed plate adapted to support a series of lead wires, a machine frame, mechanism thereon adapted to secure bridge wire to successive pairs of lead wires, movable means adapted to support opposite ends of the plate, and means laterally engageable with the plate to accurately position it relative to the machine frame.

37. In a machine for securing a bridge wire between the ends of the lead wires of a detonator, in combination, an orificed plate adapted to support a series of lead wires, a machine frame, mechanism thereon adapted to secure bridge wire to successive pairs of lead wires, centering devices on opposite sides of the plate and complementary centering devices cooperating therewith, a frame supporting one of said complementary devices, and means to move the last named frame laterally and vertically to allow the plate to be positioned 38. In a machine for securing a bridge wire between the ends of the lead wires of a detonator, in combination, an orificed plate adapted to support a series of lead wires, a machine frame, mechanism thereon adapted to secure bridge wire to successive pairs of lead wires, centering devices on opposite sides of the plate and complementary centering devices cooperating therewith, a frame supporting one of said complementary devices, supports engaging the ends of the plate and adapted to move the plate laterally to effect engagement of one set of centering devices, and means to move the last named frame vertically and laterally to effect engagement of the other set of centering devices.

39. In a machine for securing a bridge wire between the ends of the lead wires of a detonator, in combination, lead wire supporting means, a carriage movable along said supporting means, bridge wire feeding means, welding mechanism on the carriage adapted to weld bridge wire to successive pairs of lead wires, driving means and mechanism operable thereby to impart a step by step movement to the carriage and to operate the welding mechanism, a driving motor, an electric circuit therefrom, a switch in the circuit, and means operable from the driving means to open said switch when the carriage reaches the end of its desired movement.

40. In a machine for securing a bridge wire between the ends of the lead wires of a detonator, in combination, lead wire supporting means, a carriage movable along said supporting means, bridge wire feeding means, welding mechanism on the carriage adapted to weld bridge wire to successive pairs of lead wires, driving means and mechanism operable thereby to impart a step by step movement to the carriage and to operate the welding mechanism, a driving motor, an electric circuit therefrom, a switch in the circuit, reducing gearing operable from the driving means, and means operable from the reducing gearing to open the switch when the carriage reaches a predetermined point in its travel.

In testimony of which invention I have hereunto set my hand at Philadelphia, Penna., on this 8th day of March, 1927.

JOSEPH STUART, II.